UNITED STATES PATENT OFFICE.

IGNAZ ROSENBERG AND FRIEDRICH KRECKE, OF BIEBRICH, GERMANY, ASSIGNORS TO KALLE & CO., OF SAME PLACE.

NAPHTHYLENEDIAMIN-SULFO-ACID AND PROCESS OF MAKING IT.

SPECIFICATION forming part of Letters Patent No. 587,757, dated August 10, 1897.

Application filed July 29, 1896. Serial No. 600,978. (Specimens.) Patented in England May 7, 1895, No. 9,103, and in France May 22, 1895, No. 247,626.

*To all whom it may concern:*

Be it known that we, IGNAZ ROSENBERG and FRIEDRICH KRECKE, residing at Biebrich-on-the-Rhine, in the Empire of Germany, have invented a new and useful Improvement in the Manufacture of Naphthylenediamin and Derivatives Thereof, (for which our assignees, Kalle & Co., have already obtained Letters Patent in England, No. 9,103, dated May 7, 1895, and in France, No. 247,626, dated May 22, 1895,) of which the following is an exact description.

Our invention relates to the production of a new naphthylenediamin and of monoamido and monosulfo and disulfo derivatives thereof.

The new naphthylenediamin is characterized by the relative position of the two amido groups, which is designated as meta or 1.3 position. The above-mentioned compounds derived from this new naphthylenediamin contain the substituting amido group or the substituting sulfo group or groups in the 5, 6, 7, or 8 position—that is to say, in that benzene ring of the naphthalene nucleus which is not connected with the two characteristic amido groups. The 1.3 naphthylenediamin, which with the said derivatives forms the subject-matter of this application, is produced by heating the alpha-naphthol-monosulfo-acid or the alpha-naphthylamin-monosulfo-acid, which contain the substituting groups in the 1.3 position, with an excess of ammonia in an autoclave to temperatures between 160° and 190° centigrade.

We obtain mono and di sulfo-acids of the new naphthylenediamin if we employ in the above reaction alpha-naphthol or alpha-naphthylamin di and tri sulfo-acids, which contain one sulfo group in the meta (3) position and the second sulfo group or the second and third sulfo groups in the 5, 6, 7, or 8 position. We obtain amido derivatives of the new naphthylenediamin—in other words, triamido naphthalenes—if oxy or amido derivatives of alpha-naphthol oral pha-naphthylamin-monosulfo-acid (1.3) are employed in the above reaction, which contain the substituting hydroxyl or amido group in the 5, 6, 7, or 8 position.

The conversion leading to those new bodies is shown by the following formula:

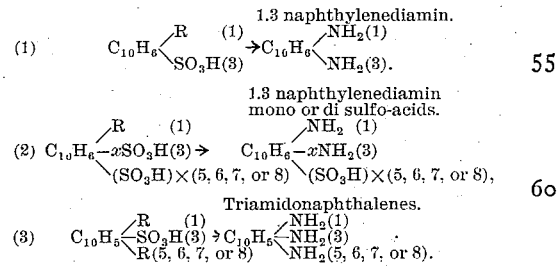

In these formulæ R stands for a hydroxyl or amido group. In formula (2) $(SO_3H) \times (5, 6, 7, or 8)$ stands for one or two sulfo groups in positions 5, 6, 7, or 8.

In the manufacture of mono and di sulfo-acids of the new naphthylenediamin it is not necessary to isolate and purify such alpha-naphthol di or tri sulfo-acids as are going to be used as starting materials. Instead of the pure bodies we may employ the mass of reaction obtained in the preparation of such alpha-naphthol-sulfo-acids. For instance, in case of alpha-naphthol-disulfo-acids, obtainable by heating naphthalene-trisulfo-acids in closed vessels with caustic soda-lye, the corresponding naphthalenediamin-monosulfo-acid is formed if such a finished melt is subsequently treated in the same vessel with an excess of ammonia. By combining this new class of bodies with various diazo and tetrazo compounds a series of dyestuffs is obtained which is of great value specially for cotton-dyeing. They may further be utilized for the manufacture of azin colors.

Example I: In order to prepare 1.3 naphthalenediamin, fifty-six kilos of 1.3 naphthol-sulfo-acid are heated in an autoclave with twenty kilos caustic soda-lye, (40° Baumé,) seventy-five kilos ammonium chlorid, and about two hundred kilos of ammonia liquor (twenty-two per cent. $NH_3$) for twenty hours to 160° to 190° centigrade. The resulting melt is acidulated with sulfuric acid, which liberates a large quantity of sulfurous acid. From the yet warm liquor the 1.3 naphthalenediamin sulfate crystallized in short needles. The hydrochlorate is much easier soluble than the sulfate. Nitrous acid causes a yellow coloration.

Example II: In order to prepare 1.3.6 naphthalenediamin-monosulfo-acid, sixty-five kilos of 1.3.6 naphthol-disulfo-acid are heated in an autoclave with thirty kilos of caustic soda-lye, (40° Baumé,) fifty kilos ammonium chlorid, and about three hundred kilos of ammonia liquor to 160° to 190° centigrade for twenty hours. The resulting mass, from which the excess of ammonia is driven off, is acidulated with sulfuric acid and filtered. From the hot filtered liquor the 1.3.6 naphthalenediamin-sulfo-acid crystallizes in fine white needles, which are moderately soluble in hot, difficultly soluble in cold water. From the easily-soluble alkali salts the free acid is precipitated by addition of dilute mineral acids. It is transformed into a yellow diazo compound by the action of nitrous acid.

Example III: In order to prepare triamidonaphthalene, sixty-five kilos of 2.8.6. dioxynaphthalene monosulfo-acid (G.) are heated with twenty kilos caustic soda-lye, (40° Baumé,) seventy-five kilos ammonium chlorid, and three hundred kilos ammonia liquor in an autoclave to 160° to 190° centigrade for up to twenty hours. On acidulating the finished melt with sulfuric acid the sulfate of the 1.3.7 (2.6.8) triamidonaphthalene is separated. The sulfate is almost insoluble in cold and very little soluble in hot water. The hydrochlorate is easier soluble in water and crystallized from a hot aqueous solution in shining white leaflets. The free base is easily soluble in water and alcohol. In acid solutions of this triamidonaphthalene nitrous acid causes a deep brown coloration. Ferric chlorid, chlorid of lime, and bichromate of potash cause violent colorations.

Example IV: Naphthylenediamin-sulfo-acid (1.3.6) may also be obtained by starting directly from naphthalene-trisulfo-acid, (1.3.6.) For this purpose two hundred and twenty kilos naphthalene-trisulfonate of sodium are treated with two hundred kilos caustic soda-lye (fifty per cent.) in an autoclave at a temperature of 140° to 160° centigrade for ten hours. After cooling the mass of retraction is mixed with five hundred kilos of ammonia liquor and one hundred and twenty kilos chlorid of ammonium and heated for twelve to thirty hours to 175° centigrade. The product is then isolated in the same manner as described in Example II.

Now what we claim is—

1. The process of manufacturing the new naphthylenediamin

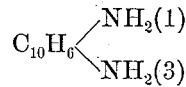

consisting in heating monosulfo-acids of alpha-naphthol, which contain the two substituting groups in the meta or 1.3 position, with an excess of ammonia in autoclaves at temperatures from 160° to 190° centigrade substantially as described.

2. The process of manufacturing 1.3 naphthylenediamin-sulfo-acids by heating in autoclaves with an excess of ammonia at temperatures between 160° and 190° centigrade such alpha-naphthol-sulfo-acids, which contain one sulfo group in meta or 3 position to the hydroxyl or amido group and the second sulfo group or the second and third sulfo groups in 5.6.7. or 8 position substantially as described.

3. The process of manufacturing the new naphthylenediamin-monosulfo-acid

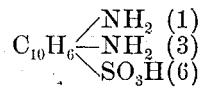

consisting in heating the 1.3.6 naphthol-disulfo-acid in an autoclave with an excess of ammonia at temperatures between 160° and 190° centigrade for about twenty hours substantially as described.

4. A naphthylenediamin compound characterized by containing two amido groups in meta or 1.3 position adapted to form valuable azo dyestuffs by combining with diazotized amins and of which the following naphthylenediamin-monosulfo-acid is an example,

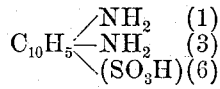

forming fine white needles when crystallized from hot aqueous solutions, being difficultly soluble in cold water, moderately soluble in hot water, forming easily-soluble alkali salts from the aqueous solution of which the free acid is precipitated by addition of dilute mineral acids and even by acetic acid giving a yellow diazo solution when acted upon by nitrous acid.

5. The new naphthylenediamin-monosulfo-acid having the formula:

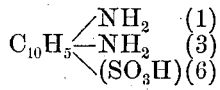

which is producible by heating 1.3.6 naphthol or naphthylamin-disulfo-acid with an excess of ammonia in an autoclave at temperatures of 160° to 190° centigrade, forming fine white needles when crystallized from hot aqueous solutions being difficultly soluble in cold water, moderately soluble in hot water, forming easily-soluble alkali salts from the aqueous solution of which the free acid is precipitated by addition of dilute mineral acids and even by acetic acid giving a yellow diazo solution when acted upon by nitrous acid.

In testimony whereof we have signed our names to this specification in the presence of two subscribing witnesses.

IGNAZ ROSENBERG.
FRIEDRICH KRECKE.

Witnesses:
HEINRICH MISCHLER,
W. HAISSLER.